(12) United States Patent
Chandra et al.

(10) Patent No.: US 7,711,364 B2
(45) Date of Patent: *May 4, 2010

(54) USER EQUIPMENT (UE) ASSISTED SYSTEM DATABASE UPDATE

(75) Inventors: Arty Chandra, Manhasset Hills, NY (US); Prabhakar R. Chitrapu, Blue Bell, PA (US); Narayan Parappil Menon, Syosset, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/405,088

(22) Filed: Apr. 17, 2006

(65) Prior Publication Data

US 2006/0183464 A1    Aug. 17, 2006

Related U.S. Application Data

(63) Continuation of application No. 10/822,502, filed on Apr. 12, 2004, now Pat. No. 7,058,405, which is a continuation of application No. 10/328,623, filed on Dec. 23, 2002, now Pat. No. 6,735,443.

(60) Provisional application No. 60/392,211, filed on Jun. 28, 2002.

(51) Int. Cl.
 *H04W 36/00* (2009.01)
(52) U.S. Cl. .................... 455/436; 455/433; 455/435.1; 455/446

(58) Field of Classification Search ................. 455/436, 455/437, 442, 443, 439, 446, 422.1, 432.3, 455/432.1, 438, 435.1, 461, 435.2; 370/331, 370/328, 332, 335
See application file for complete search history.

(56) References Cited

U.S. PATENT DOCUMENTS

| | | | |
|---|---|---|---|
| 5,457,737 A * | 10/1995 | Wen ........................... | 455/410 |
| 5,883,598 A | 3/1999 | Parl et al. | |
| 5,915,221 A | 6/1999 | Sawyer et al. | |
| 5,918,181 A * | 6/1999 | Foster et al. ............. | 455/456.1 |
| 5,918,183 A | 6/1999 | Janky et al. | |
| 6,167,274 A | 12/2000 | Smith | |
| 6,195,342 B1 | 2/2001 | Rohani | |
| 6,400,952 B2 | 6/2002 | Kim et al. | |
| 6,424,638 B1 * | 7/2002 | Ray et al. ................... | 370/331 |
| 6,430,414 B1 | 8/2002 | Sorokine et al. | |
| 6,434,387 B1 | 8/2002 | Lee | |
| 6,456,843 B1 | 9/2002 | Daly | |
| 6,493,550 B1 | 12/2002 | Raith | |
| 6,522,888 B1 | 2/2003 | Garceran et al. | |

(Continued)

FOREIGN PATENT DOCUMENTS

EP    1 081 972    3/2001

(Continued)

*Primary Examiner*—Jean A Gelin
(74) *Attorney, Agent, or Firm*—Volpe and Koenig, P.C.

(57) ABSTRACT

A wireless communication system includes a base station that receives information regarding neighboring wireless systems and updates and stores this information for use in handover of user equipments (UEs).

6 Claims, 2 Drawing Sheets

U.S. PATENT DOCUMENTS

| | | | |
|---|---|---|---|
| 6,546,052 B1 | 4/2003 | Maeda et al. | |
| 6,564,052 B1 | 5/2003 | Kawano et al. | |
| 6,591,102 B1 | 7/2003 | Chavez et al. | |
| 6,622,020 B1 * | 9/2003 | Seki | 455/456.2 |
| 6,735,443 B2 | 5/2004 | Chandra et al. | |
| 2002/0147008 A1 * | 10/2002 | Kallio | 455/426 |
| 2003/0125046 A1 | 7/2003 | Riley et al. | |
| 2003/0134638 A1 | 7/2003 | Sundar et al. | |
| 2003/0142641 A1 | 7/2003 | Sumner et al. | |

FOREIGN PATENT DOCUMENTS

| | | |
|---|---|---|
| EP | 1 215 928 | 6/2002 |
| JP | 07-220191 | 8/1995 |
| JP | 10-185595 | 7/1998 |
| JP | 2000-224657 | 8/2000 |
| JP | 2000-287256 | 10/2000 |
| JP | 2001-136121 | 5/2001 |
| JP | 2001-197538 | 7/2001 |
| JP | 2001-258060 | 9/2001 |
| JP | 2002-027522 | 1/2002 |
| JP | 2002-117492 | 4/2002 |
| JP | 2003-510987 | 9/2003 |
| JP | 2003-324470 | 11/2003 |
| JP | 2004-515177 | 5/2004 |
| WO | 01/024562 | 5/2001 |
| WO | 02/045453 | 6/2002 |

* cited by examiner

USER EQUIPMENT (UE) ASSISTED SYSTEM DATABASE UPDATE

CROSS REFERENCE TO RELATED APPLICATIONS

This application is a continuation of U.S. patent application Ser. No. 10/822,502, filed on Apr. 12, 2004 and Ser. No. 10/328,623, filed Dec. 23, 2002, which claims the benefit of U.S. provisional application No. 60/392,211 filed on Jun. 28, 2002, which is incorporated by reference as if fully set forth.

FIELD OF THE INVENTION

The present invention relates to wireless communication systems. In particular, the invention relates to database processing of information for user equipment (UE) handover.

BACKGROUND

User equipment (UE) in wireless communication systems are beginning to provide functionality for internet/public service telephone network (PSTN) access via multiple wireless systems (such as (WLANs), Bluetooth® a registered trademark for a wireless network, universal mobile telecommunications system (UMTS), general packet radio service (GPRS), etc.). Hence, there is a growing need for these systems to work with each other in order for a UE to handover from one technology to another.

To assist in a handover, a wireless communication system base station can relay to a UE the information pertaining to outside systems. Thus, a base station needs to retain and constantly update information about the other systems. Retrieval of the information about another system is possible through secure inter-system connections (such as via an IP-cloud, for example) under roaming agreements. However, it is a deployment challenge to maintain and update such information about other systems. Hence there is a need for an alternate source to assist the base station in supplying the outside system information in order to eliminate the need for explicit inter-system connections and communications for this purpose.

SUMMARY

The present invention employs a technique for obtaining and updating data relating to neighboring wireless systems.

DETAILED DESCRIPTION OF THE PREFERRED EMBODIMENTS

Figure 1:
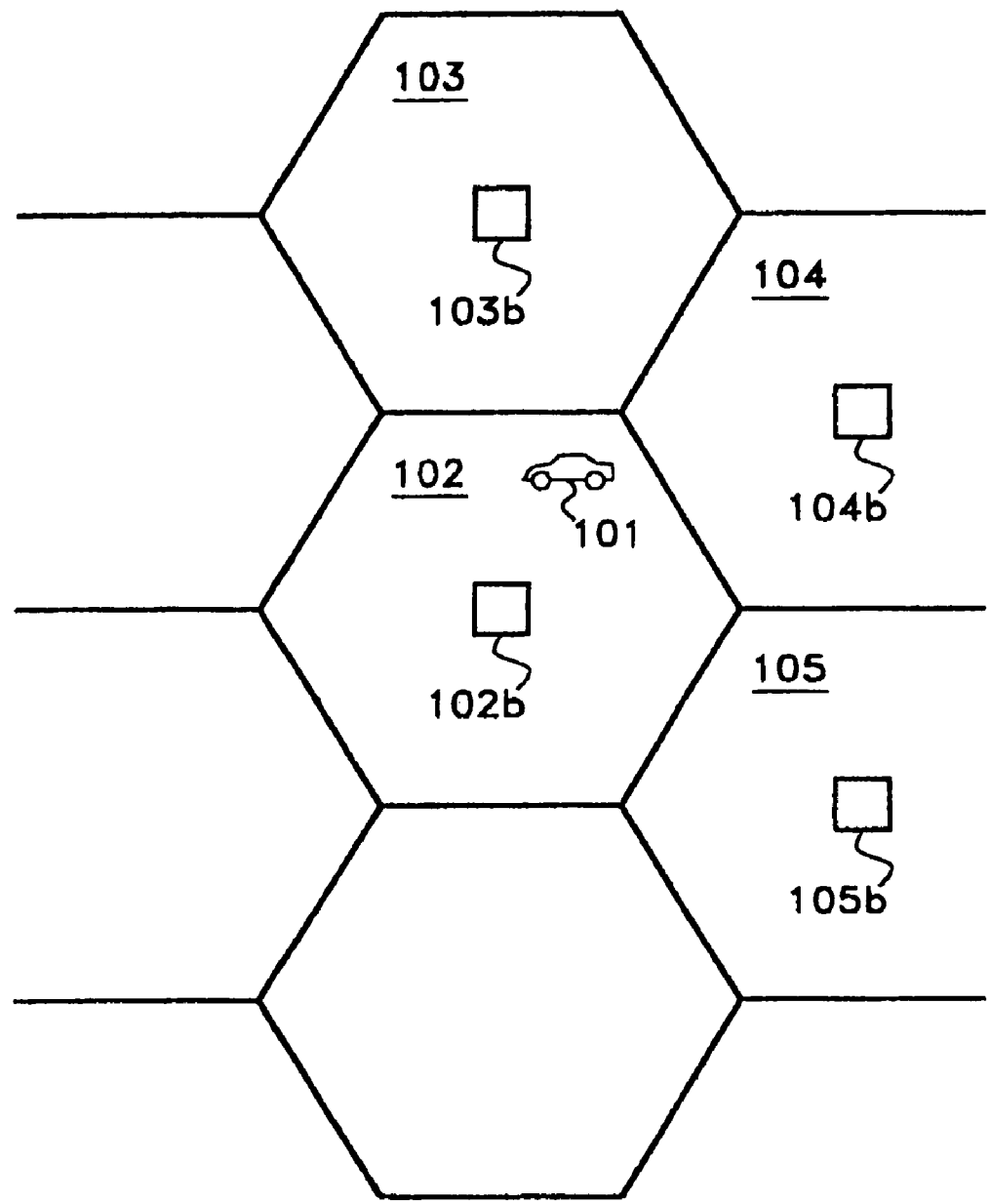
FIG. 1 is a simplified diagram showing a plurality of wireless systems and user equipments within the wireless systems, which may employ the technique and principles of the present invention to great advantage.

FIG. 1 shows a multimode UE 101 operating within a wireless system 102 having an associated base station (BS) 102b, while also being able to detect multiple surrounding wireless systems 103-105. Upon detection of information from wireless systems 103-105, UE 101 sends the current information to BS 102b of system or systems 103-105. BS 102b can then update its database based on this new information from UE 101. Likewise, subsequent handovers of UE 101 to other base stations can provide base station database updates. For example, after handover to wireless system 103, UE 101 sends information pertaining to the most recently resident system (i.e., system 102), to base station (BS) 103b, which then updates its database accordingly.

Figure 2:
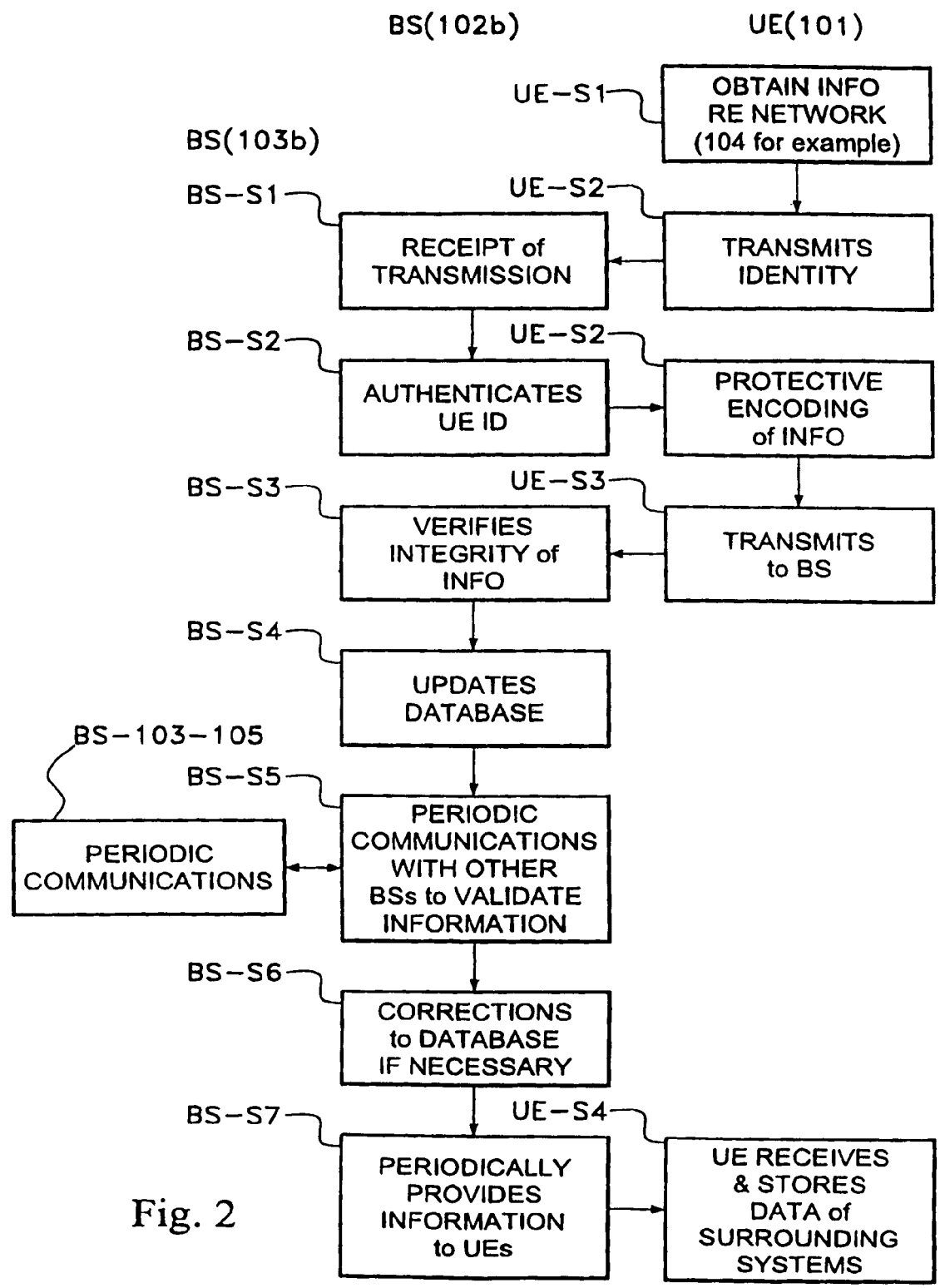
FIG. 2 is a flow diagram useful in explaining the principles of the present invention and a method to implement such a system.

FIG. 2 shows a process flow diagram for the exchange of information between BS 102b and UE 101. Although this process is shown with a single UE for simplicity in explanation, multiple UEs may interact with BS 102b at the same time. System information that is sent from a UE to the BS and vice versa may include, but is not limited to: geo-location of a UE, new system, congestion at the network and failure to detect a network.

At UE-S1, UE 101 obtains information relating to network 104, for example. At step UE-S2, UE 101 transmits its identity to BS 102b. At step BS-S1, BS 102b receives the identity of UE 101. At BS-S2 BS 102 first authenticates the identity of UE 101. This ensures that BS 102b will not accept information about other systems from malicious UEs. Next, at step UE-S2, responsive to the authentication, the information is protectively encoded for integrity by UE 101 and, at step UE-S3, the protected information is transmitted by UE 101 to BS 102b. A preferred method of protective encoding is via message authentication codes. Encryption may also be used to protect the information from being eavesdropped. At step BS-S3, BS 102b verifies the integrity of the information. At step BS-S4, BS 102b accepts the information and updates its databases. Now that BS 102b has updated its database, BS 102b, at step BS-S5, may communicate with adjacent systems 103-105 at regular intervals or triggered instants of time to validate the information updates received from UE 101. Corrections to the database, if needed are made at step BS-S6.

System efficiency can be gained by BS 102b taking a proactive role in letting UE 101 know of its surrounding systems, at step BS-S7. Hence, UE 101 need not send any information if its resident system is on the list provided by BS 102b. This reduces radio traffic due to multiple UEs sending similar information.

This database stored in each BS is used for cell re-planning and system layover during deployment of additional networks. For example, consider a UMTS system overlaid over disjointed WLANs. The information gathered at the UMTS base station is used for planning WLAN network in that area. System 102 gets geo-locations of different UEs as they communicate about other systems (say System 103). The operator can use the geo-location of each UE that reported about system 103 to approximate the coverage of system 103. This approximate coverage area can be used to plug coverage holes or future deployment planning of system 103.

What is claimed is:

1. A method for updating a system database of a base station based on information sent by a user equipment (UE) using a first radio access technology, the method comprising:

Receiving a first information packet at the base station from the UE, wherein the first information packet comprises detection of an adjacent base station that uses a second radio access technology;

the base station communicating with the adjacent base station to validate the first information packet received from the UE;

updating the system database in the base station with the first information received from the UE wherein the information comprises detection of the system;
adjusting base station coverage based on the first information received from the UE;
transmitting a second information packet regarding the adjacent base station to the UE;
the base station authenticating an identity of the UE; and
the base station receiving an encrypted message, responsive to the authentication, from the UE.

2. The method of claim 1, further comprising:
the base station receiving traffic loading information from the UE; and
the base station updating the system database to include traffic loading information.

3. The method of claim 1 wherein the first information packet comprises signal power levels of the neighboring system.

4. The method of claim 1 further comprising the base station receiving geo-location information together with a message authentication code.

5. The method of claim 1 further comprising the base station communicating with the adjacent base station at regular intervals.

6. The method of claim 1 further comprising the base station communicating with the adjacent base station based on a time trigger.

* * * * *